(12) United States Patent
Feng et al.

(10) Patent No.: US 8,154,579 B2
(45) Date of Patent: Apr. 10, 2012

(54) METHOD FOR PROCESSING THE VIDEO TELEPHONE CALLING BASED ON THE MOBILE COMMUNICATION NETWORK

(75) Inventors: Lingjun Feng, Beijing (CN); Zhangzhe Liu, Beijing (CN); Congxing Ouyang, Beijing (CN); Jianfeng Tang, Beijing (CN); Zhaohui Zheng, Beijing (CN); Bing Wei, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 954 days.

(21) Appl. No.: 11/915,824

(22) PCT Filed: Apr. 21, 2006

(86) PCT No.: PCT/CN2006/000761
§ 371 (c)(1),
(2), (4) Date: Jun. 30, 2008

(87) PCT Pub. No.: WO2006/131043
PCT Pub. Date: Dec. 14, 2006

(65) Prior Publication Data
US 2008/0309750 A1 Dec. 18, 2008

(30) Foreign Application Priority Data
Jun. 10, 2005 (CN) .......................... 2005 1 0076732

(51) Int. Cl.
*H04N 7/14* (2006.01)

(52) U.S. Cl. ................................. 348/14.02; 348/14.11

(58) Field of Classification Search ............... 348/14.02, 348/14.01, 14.11; 379/93.23, 88.19–88.21, 379/142.01; 455/566–567
See application file for complete search history.

(56) References Cited

FOREIGN PATENT DOCUMENTS

| CN | 1581997 A | 2/2005 |
|---|---|---|
| EP | 0924917 | 6/1999 |
| EP | 1398941 | 3/2004 |
| JP | 8195943 A | 7/1996 |
| JP | 2004336349 A | 11/2004 |
| KR | 20020073674 | 9/2002 |
| KR | 100958133 | 5/2010 |
| WO | WO2005120115 A1 | 12/2005 |

OTHER PUBLICATIONS

European Search Report, Application No. 06741701.4-2414, Applicant—China Mobile Communications Corporation.
KIPO Notice of Grounds for Rejection, Korean Patent Application No. 10-2008-7000128, Applicant—China Mobile Communications Corporation.

*Primary Examiner* — Tuan Nguyen
(74) *Attorney, Agent, or Firm* — J.C. Patents

(57) ABSTRACT

The present invention discloses a method for processing the video telephone calling based on the mobile communication network. A calling terminal initiates a video telephone calling to a called telephone terminal, and when said called terminal is ringing, the called user is entitled to determine whether to cut off the telephone calling; the called terminal receives a operating information that the called user can't proceed the video telephone, and sends a disconnecting message with a reason value that called party can't proceed the video telephone to a called party mobile switch; the called party mobile switch disconnects the communication between the called party mobile switch and the called terminal and transmits the disconnecting message to a calling party mobile switch; the calling party mobile switch disconnects the communication between the calling party mobile switch and the called party mobile switch and transmits the disconnecting message to the calling terminal; and the calling terminal disconnects the communication telephone between the calling terminal and the calling party mobile switch. The present invention expands the function of the mobile user terminal and is significant to the development of electronic commerce of the mobile video telephone user.

6 Claims, 3 Drawing Sheets

METHOD FOR PROCESSING THE VIDEO TELEPHONE CALLING BASED ON THE MOBILE COMMUNICATION NETWORK

FIELD OF THE INVENTION

The present invention relates to a method for processing the video telephone calling, especially to a processing method, when the called terminal can't receive the video telephone initiated by the calling party and determinates to withdraw said video telephone calling, in the mobile communication network, and it belongs to the field of mobile communication technology.

BACKGROUND OF THE INVENTION

As an advanced service with all features of 3G communication service, the mobile video telephone service enters into reality more and more nearly with the coming of 3G service. The mobile video telephone is a point-to-point communication service by using video and voice at the same time, and it accomplishes a two-way real-time exchange of video and voice between the mobile terminal and mobile terminal, immobile video telephone terminal or PC and so on. The mobile video telephone combines mobile communication technology and television technology and is provided with functions of watching, listening and talking; it uses the International Telecommunication Union (ITU-324) standard, integrates videography, picture, voice compressed, MPEG coding and decoding in a whole and is a technology with well development foreground.

In prior art, if a user initiates a video telephone calling to a called user by using a mobile terminal, while the mobile terminal of the called user doesn't have the function of video telephone communication or the network of the called party can't support the function of video telephone so the video telephone can't be received, both sides have to withdraw to the voice communication. The specific way of withdrawing has been prescribed in relevant international standards. However, if the mobile terminal of the called party is a video telephone user, and when the calling mobile terminal user dials the called mobile terminal but the called user is inconvenient or unwilling to answer the video telephone, the present network system can't deal with it. Accordingly, there is not any relevant provision in the existing international standard and the relevant technical solution has not been found in this field.

SUMMARY OF THE INVENTION

In view of that, the object of the present invention is to provide a method for processing the video telephone calling based on the mobile communication network for the mobile terminal, and when the calling user calls the other side by using a video telephone, he can proceed to deal with it accordingly when the user of the called party mobile terminal chooses to withdraw.

The object of the present invention is accomplished through the following technical solution:

a calling terminal initiates a video telephone calling to a called terminal, and when said called terminal is ringing, said called terminal receives a operating information that the called user can't proceed the video telephone and sends a disconnecting message with a reason value that the called party can't proceed the video telephone to a called party mobile switch;

said called party mobile switch disconnects the communication between the called party mobile switch and the called terminal and transmits said disconnecting message to a calling party mobile switch;

said calling party mobile switch disconnects the communication between said calling party mobile switch and said called party mobile switch and transmits said disconnecting message to the calling terminal; and said calling terminal disconnects the communication between said calling terminal and said calling party mobile switch.

It can be seen from above technical solution that the present invention is that when a calling terminal initiates a video telephone calling to a called terminal and the called terminal is ringing, it may process the operation that the called user determines to cut off the telephone calling, and it expands the function of processing the video telephone service by the mobile user terminal and the mobile communication network.

DETAILED DESCRIPTION OF THE PREFERRED EMBODIMENTS

The technical solution of the present invention will be more fully described by the following detailed description of preferred embodiments of the present invention which is to be considered together with the accompanying drawings.

Figure 1:
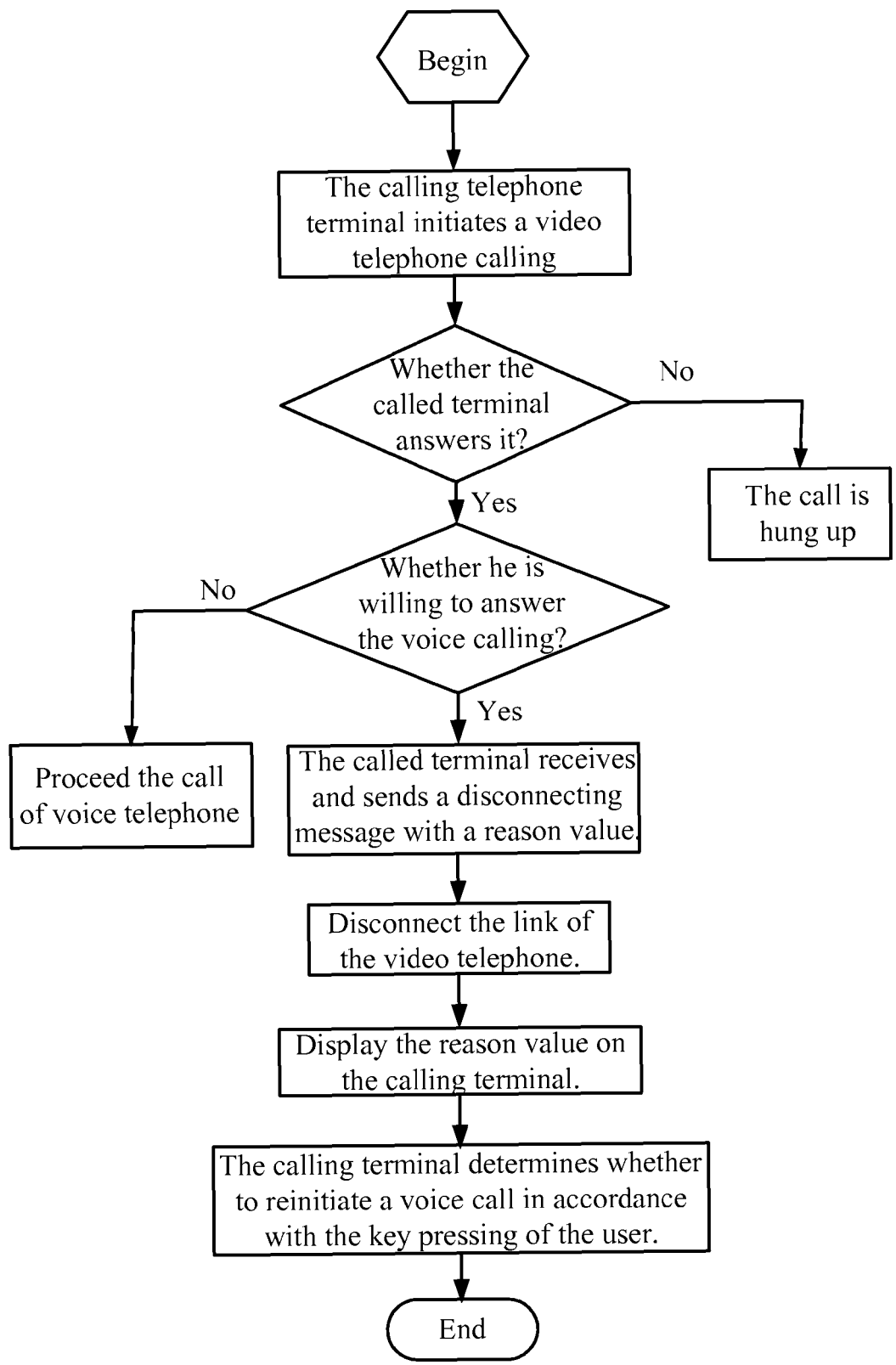
FIG. 1 is the flow chart of Embodiment 1 according to the present invention

As shown in FIG. 1, the video calling terminal initiates a video telephone calling to a video called terminal, and when the video called terminal is ringing, the mobile terminal user of the called party may choose to establish a call in the form of voice or video by pressing a key, that is to say, the mobile terminal user of the called party may determine whether to withdraw to the communication network of the voice telephone to proceed a voice call.

When the called user determines to withdraw, at the same time he may also send a message that the voice call could be proceeded. After the called terminal receives the operating information that the called user can't proceed the video telephone, the called terminal sends a disconnecting message with a reason value that called party can't proceed the video telephone to a called party mobile switch; the called party mobile switch disconnects the communication between the called party mobile switch and the called terminal and transmits the disconnecting message and the reason value to a calling party mobile switch; the calling party mobile switch disconnects the communication between the calling party mobile switch and the called party mobile switch and transmits the disconnecting message and the reason value to the calling terminal; and the calling terminal disconnects the communication between the calling terminal and the calling party mobile switch.

After the calling terminal receives the disconnecting message with the reason value that the called party can't proceed the video telephone, when it disconnects the communication link between the calling terminal and the calling party mobile switch, it hangs up the calling; a calling request of voice telephone may also be initiated from the calling terminal to the calling party mobile switch, and the communication link of voice telephone between the calling terminal and the called terminal can be established accordingly.

After the calling terminal receives the disconnecting message with the reason value that the called party can't proceed the video telephone, it may display the information that the called user has determined not to proceed the operation of the video telephone communication corresponding to the reason value, therefore, the calling terminal may initiate a calling of voice telephone to the calling party mobile switch over again. This calling initiated over again may be accomplished by using the following manners:

1. in accordance with the requirement, the calling user manually initiates a voice call over again based on a voice telephone link, at this time, in accordance with the operation of the calling user, the calling terminal initiates a voice call over again based on the voice telephone link.

Figure 2:
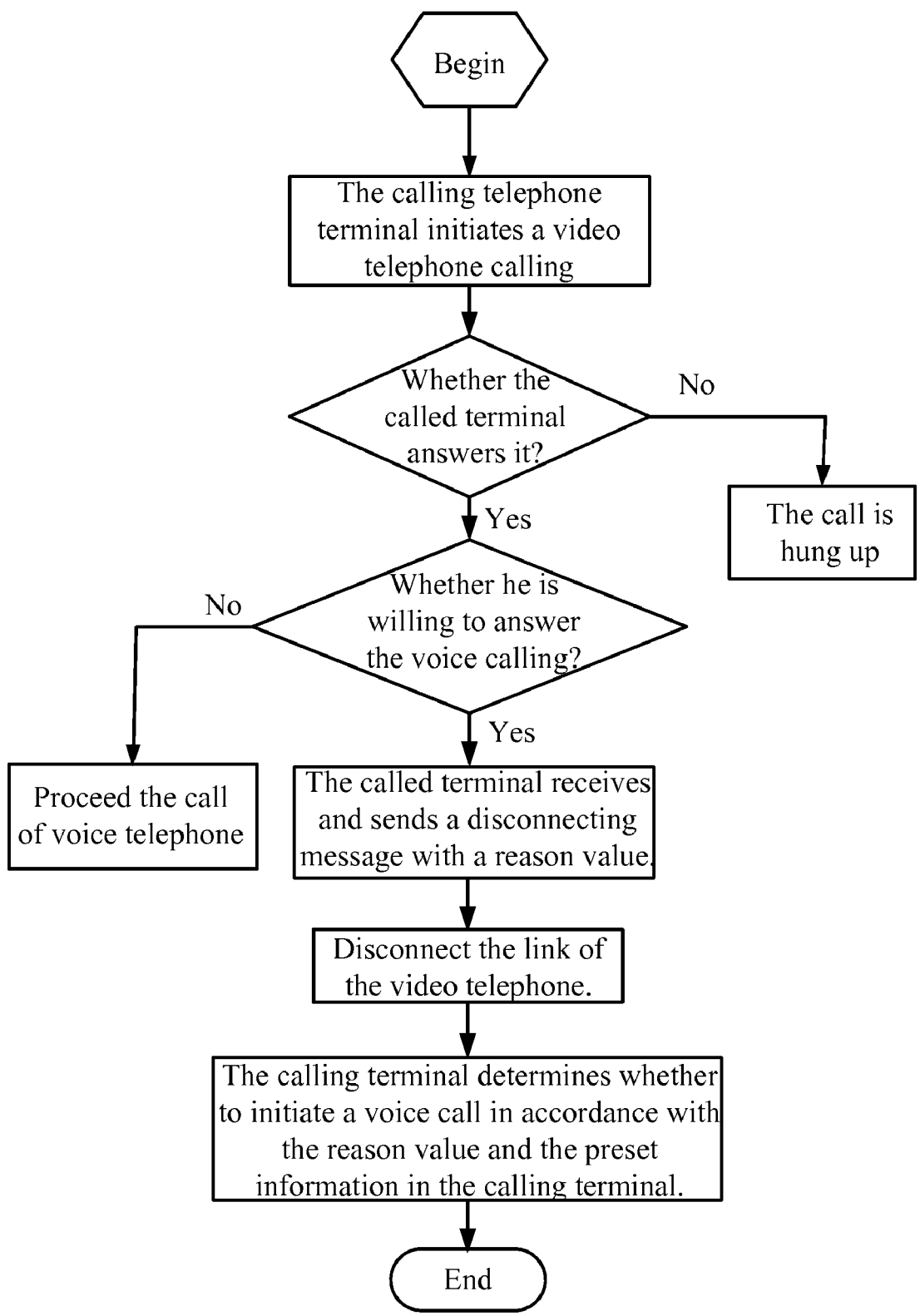
FIG. 2 is the flow chart of Embodiment 2 according to the present invention

2. as shown in FIG. 2, initiating the voice call over again based on the voice telephone link may be accomplished as follows: after disconnecting the communication link of video telephone between the calling terminal and the called terminal, the calling terminal automatically initiates a voice telephone calling over again and reestablishes a communication link of voice telephone between calling terminal and called terminal of telephone in accordance with the reason value in the disconnecting message and a aforehand setting in the calling terminal by the calling user. This aforehand setting, in fact, is to save a parameter in said calling terminal for expressing whether the calling terminal automatically reinitiates a voice call towards the above called terminal, when the called terminal determines to withdraw the video telephone calling initiated by the calling terminal.

Figure 3:
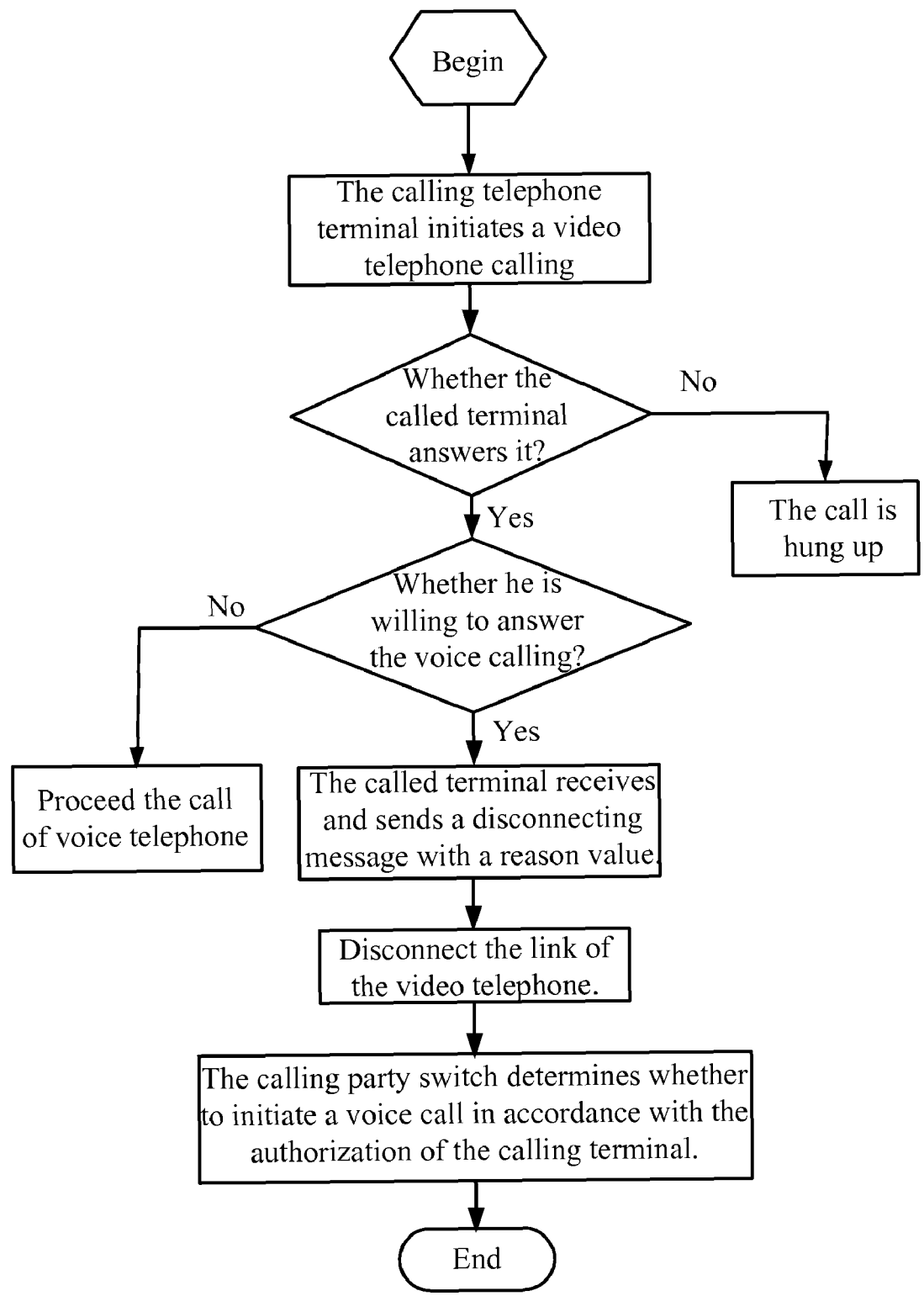
FIG. 3 is the flow chart of Embodiment 3 according to the present invention.

3. as shown in FIG. 3, initiating the voice call over again based on the voice telephone link may be accomplished as follows: after disconnecting the communication link of voice telephone between the calling terminal and the called terminal, the calling party mobile switch sends the disconnecting message to the calling terminal, the calling party mobile switch automatically reinitiates a calling of voice telephone and establishes a communication link of voice telephone between a calling terminal and a called terminal, in accordance with the reason value in said disconnecting message and a authorization setting that the calling user opens the automatic withdrawing service (this authorization is an authorization provided to by the calling user to the networks operators whether opening the automatic withdrawing service). This authorization setting that the calling user opens the automatic withdrawing service, in fact, is a parameter saved in the calling party mobile switch for expressing whether the calling party mobile switch automatically reinitiates a voice call towards the above called terminal, when the called terminal determines to withdraw the video telephone calling initiated by the calling terminal. After the calling party mobile switch automatically reinitiates a voice call towards the above called terminal, it also needs to establish a voice communication link between the calling party mobile switch and the calling terminal.

Regardless of whether the audio calling is reinitiated automatically by the calling terminal or the calling party mobile switch, the above reason value that the called determines to withdraw could be sent to the calling terminal before or after reinitiating the voice call, and the calling terminal may display the relevant information that the called terminal determines to withdraw in the calling terminal in accordance with the reason value.

Finally, it should be understood that the above embodiments are only used to explain, but not to limit the technical solution of the present invention. In despite of describing the present invention in detail with reference to the preferred embodiments, it should be understood that various modifications, changes or equivalent replacements could be made by an ordinary person skilled in the relevant field without departing from the spirit and scope of the technical solution of the present invention, which should be covered in the extent of the claims of the present invention.

What is claimed is:

1. A method for processing a video telephone calling based on a mobile communication network, characterized in that:
   a calling terminal initiates a video telephone calling to a called terminal, and when said called terminal is ringing, said called terminal receives a operating information indicating that a called user who is using the called terminal can't proceed the video telephone calling and sends a disconnecting message with a reason value indicating that the called user can't proceed the video telephone calling to a called party mobile switch;
   said called party mobile switch disconnects the communication between the called party mobile switch and the called terminal, and transmits said disconnecting message to a calling party mobile switch;
   said calling party mobile switch disconnects the communication between said calling party mobile switch and said called party mobile switch, and transmits said disconnecting message to the calling terminal;
   said calling terminal disconnects the communication between said calling terminal and said calling party mobile switch; and
   said calling terminal or said calling party mobile switch reinitiates a new voice telephone calling to said called terminal according to the reason value.

2. The method for processing a video telephone calling based on a mobile communication network as claimed in claim 1, characterized in that after said calling terminal disconnects the communication between said calling terminal and said calling party mobile switch, said calling terminal displays information to the calling user in accordance with the reason value in said disconnecting message.

3. The method for processing a video telephone calling based on a mobile communication network as claimed in claim 2, characterized in that the step that said calling terminal or said calling party mobile switch reinitiates a new voice telephone calling to said called terminal according to the reason value comprises that said calling terminal receives a key pressing from a calling user who is using the calling terminal and reinitiates a new voice telephone calling to said called terminal in accordance with the key pressing.

4. The method for processing a video telephone calling based on a mobile communication network as claimed in claim 2, characterized in that the step that said calling terminal or said calling party mobile switch reinitiates a new voice telephone calling to said called terminal according to the reason value comprises that said calling terminal automatically reinitiates a new voice telephone calling to said called terminal in accordance with the reason value in said disconnecting message and a preset information in said calling terminal.

5. The method for processing a video telephone calling based on a mobile communication network as claimed in claim 1, characterized in that the step that said calling terminal or said calling party mobile switch reinitiates a new voice telephonecalling to said called terminal according to the reason value comprises that said calling terminal automatically reinitiates a voice telephone calling to said called terminal in accordance with the reason value in said disconnecting message and the preset information in said calling terminal.

6. The method for processing a video telephone calling based on a mobile communication network as claimed in claim 1, characterized in that the step that said calling terminal or said calling party mobile switch reinitiates a new voice telephone calling to said called terminal according to the reason value comprises that said calling party mobile switch automatically reinitiates a new voice telephone calling to said called terminal in accordance with the reason value in said disconnecting message and a authorization information indicating that the calling user opens an automatic withdrawing service, and after the voice telephone calling is reinitiated, it establishes a link between said calling terminal and said calling party mobile switch.

\* \* \* \* \*